(12) United States Patent
Li et al.

(10) Patent No.: US 12,028,217 B2
(45) Date of Patent: Jul. 2, 2024

(54) COMMUNICATION METHOD, APPARATUS, AND SYSTEM

(71) Applicant: HUAWEI TECHNOLOGIES CO., LTD., Shenzhen (CN)

(72) Inventors: Yexing Li, Shanghai (CN); Longyu Cao, Shanghai (CN); Dong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/068,300

(22) Filed: Dec. 19, 2022

(65) Prior Publication Data

US 2023/0121383 A1    Apr. 20, 2023

Related U.S. Application Data

(63) Continuation of application No. PCT/CN2021/100359, filed on Jun. 16, 2021.

(30) Foreign Application Priority Data

Jun. 17, 2020 (CN) .......................... 202010555502.6

(51) Int. Cl.
   *G06F 15/173*    (2006.01)
   *H04L 41/0894*   (2022.01)
(52) U.S. Cl.
   CPC ................................ *H04L 41/0894* (2022.05)
(58) Field of Classification Search
   CPC .................................................. H04L 41/0894
   See application file for complete search history.

(56) References Cited

FOREIGN PATENT DOCUMENTS

| CN | 101321357 A | 12/2008 |
|----|-------------|---------|
| CN | 105871576 A | 8/2016  |
| CN | 110933711 A | 3/2020  |
| CN | 111277442 A | 6/2020  |
| WO | 2020050671 A1 | 3/2020 |

OTHER PUBLICATIONS

"Experiential Networked Intelligence (ENI); Terminology for Main Concepts in ENI," ETSI GR ENI 004 V2.1.1, Sophia Antipolis, Cedex, France, Total 20 pages, European Telecommunications Standards Institute (Oct. 2019).

"Update clause 6.2 operation and notification for intent," 3GPP TSG-SA5 Meeting #128, Zhuhai, China, S5-197097, Total 2 pages, 3rd Generation Partnership Project, Valbonne, France (Nov. 18-22, 2019).

(Continued)

*Primary Examiner* — Joseph R Maniwang
(74) *Attorney, Agent, or Firm* — Leydig, Voit & Mayer, Ltd.

(57) ABSTRACT

A communication method and apparatus are provided. A first network element receives a policy creation request from a second network element, wherein a type of a policy requested to be created includes an intent policy or a non-intent policy; and sends a policy processing request to a third network element, wherein the policy processing request includes a policy type identifier, and the policy type identifier indicates that the policy is the intent policy or the non-intent policy. According to the present disclosure, policy execution reliability is improved.

20 Claims, 10 Drawing Sheets

(56) References Cited

OTHER PUBLICATIONS

"3rd Generation Partnership Project; Technical Specification Group Services and System Aspects; Telecommunication management; Study on scenarios for Intent driven management services for mobile networks (Release 16)," 3GPP TR 28.812 V0.10.0, pp. 1-48, 3rd Generation Partnership Project, Valbonne, France (Mar. 2020).

"Experiential Networked Intelligence (ENI); Intent Aware Network Autonomicity," European Telecommunications Standards Institute, Group Report, ETSI GR ENI 008 V0.0.10, Total 21 pages (Mar. 2020).

"Experiential Networked Intelligence (ENI); System Architecture," European Telecommunications Standards Institute, Group Specification, ETSI GS ENI 005 V2.0.13, Total 150 pages (Jun. 2020).

COMMUNICATION METHOD, APPARATUS, AND SYSTEM

CROSS-REFERENCE TO RELATED APPLICATIONS

This application is a continuation of International Patent Application No. PCT/CN2021/100359, filed on Jun. 16, 2021, which claims priority to Chinese Patent Application No. 202010555502.6 filed on Jun. 17, 2020. The disclosures of the aforementioned applications are hereby incorporated by reference in their entireties.

TECHNICAL FIELD

The present disclosure relates to the field of network intelligence technologies. Embodiments of the present disclosure provide a communication method, apparatus, and system.

BACKGROUND

Experiential networked intelligence (ENI) defines a context-aware and metadata-driven self-closed-loop reference architecture. An ENI architecture may convert a network management policy into a final executable command, rule, or sub-policy. Two types of policies are defined: an intent policy and a non-intent policy. Different processing procedures need to be used for the two different types of policies.

FIG. 1 is a schematic diagram of an architecture of an intent driven management service (IDMS). An intent driven management system includes an IDM service consumer, an IDM service producer, and a network infrastructure. The network infrastructure may be physical or virtual. In IDM, a service-oriented interface is used to deliver an intent. Specifically, the IDM service consumer delivers an intent to the IDM service producer by invoking an intent driven management service (IDMS) interface. The IDM service producer translates the intent into a specific execution policy and delivers the policy to the network infrastructure, and continuously monitors a network status during intent execution to ensure that the intent is fulfilled or maintained.

FIG. 2a and FIG. 2b show two manners in which the IDMS consumer delivers an intent policy to the IDMS producer. In FIG. 2a, the IDMS consumer delivers the intent policy to the IDMS producer through a conventional management service (MnS) interface. In FIG. 2b, the IDMS consumer delivers the intent policy to the IDMS producer through a dedicated intent interface, namely, an intent driven management service (intent driven MnS) interface.

However, in a current intent-based ENI architecture, an interface for inputting an intent policy to the intent-based ENI architecture is the same as an interface for inputting a non-intent policy to the intent-based ENI architecture. Therefore, when a policy is delivered to the ENI architecture through the input interface, the ENI architecture cannot identify a type of the policy. Consequently, an intent policy cannot be correctly translated and executed.

SUMMARY

Embodiments of the present disclosure provide a communication method, apparatus, and system, to determine a type of a policy requested to be created and perform corresponding policy processing, so as to improve policy execution reliability.

According to a first aspect, a communication method is provided. The method includes: A first network element receives a policy creation request from a second network element, where a type of a policy requested to be created includes an intent policy or a non-intent policy. The first network element sends a policy processing request to a third network element, where the policy processing request includes a policy type identifier, and the policy type identifier indicates that the policy is the intent policy or the non-intent policy. In this aspect, after receiving the policy creation request from the second network element, the first network element can determine the type of the policy requested to be created, and indicate the third network element to perform corresponding policy processing. This improves policy execution reliability.

In a possible implementation, the method further includes: The first network element identifies the type of the policy based on the policy creation request.

In another possible implementation, the policy creation request includes the policy type identifier, and that the first network element identifies the type of the policy based on the policy creation request includes: The first network element identifies the type of the policy based on the policy type identifier. In this implementation, the policy creation request carries the policy type identifier, and the first network element may accurately identify the type of the policy based on the policy type identifier.

In another possible implementation, the policy creation request further includes a policy expression, and the policy type identifier is included in the policy expression, or the policy type identifier is included in a separate information element in the policy creation request.

In another possible implementation, that the first network element identifies the type of the policy based on the policy creation request includes: The first network element identifies the type of the policy based on an interface through which the policy creation request is received or a message name of the policy creation request, where different types of policies correspond to different message names. The method further includes: The first network element determines the policy type identifier based on the identified type of the policy. In this implementation, the second network element may send policy creation requests through different physical interfaces or different logical interfaces, and the first network element may identify, based on different interfaces through which the policy creation requests are received, types of policies requested to be created by using the policy creation requests. Alternatively, for different types of policies, message names of policy creation requests sent by the second network element are different, and the first network element may identify the types of the policies based on the message names of the policy creation requests. For example, if the policy is the intent policy, the second network element sends an implementIntent invoking message. Alternatively, if the policy is the non-intent policy, the second network element sends a configuration message.

According to a second aspect, a communication method is provided. The method includes: A third network element receives a policy processing request from a first network element, where the policy processing request includes a policy type identifier, and the policy type identifier indicates that a policy is an intent policy or a non-intent policy. The third network element processes the intent policy based on the policy processing request if the policy is the intent policy; or the third network element processes the non-intent policy based on the policy processing request if the policy is the non-intent policy. In this aspect, the third network element receives the policy processing request from the first network element, and the first network element clearly indicates the policy type identifier in the policy processing request, so that the third network element may perform different processing procedures based on different types of policies. This improves policy execution reliability.

In a possible implementation, the policy processing request further includes a policy expression, and that the third network element processes the intent policy based on the policy processing request if the policy is the intent policy includes: The third network element generates an intent identifier based on the policy expression. The third network element queries an intent knowledge repository based on the policy expression, to obtain a query result. The third network element orchestrates the query result, to obtain an orchestration result, where the orchestration result includes one or more of the following information: an intent executable command, a correspondence between an identifier of an execution device of the intent executable command and a format of the intent executable command, and an intent target fulfillment condition. The third network element indicates, based on the orchestration result, the execution device to execute the intent executable command.

In another possible implementation, the policy processing request further includes a policy expression, and that the third network element processes the non-intent policy based on the policy processing request if the policy is the non-intent policy includes: The third network element processes the non-intent policy based on the policy expression.

According to a third aspect, a communication apparatus is provided. The apparatus includes: a transceiver unit, configured to receive a policy creation request from a second network element, where a type of a policy requested to be created includes an intent policy or a non-intent policy. The transceiver unit is further configured to send a policy processing request to a third network element, where the policy processing request includes a policy type identifier, and the policy type identifier indicates that the policy is the intent policy or the non-intent policy.

In a possible implementation, the apparatus further includes: a processing unit, configured to identify the type of the policy based on the policy creation request.

In another possible implementation, the policy creation request includes the policy type identifier, and the processing unit is configured to identify the type of the policy based on the policy type identifier.

In another possible implementation, the policy creation request further includes a policy expression, and the policy type identifier is included in the policy expression, or the policy type identifier is included in a separate information element in the policy creation request.

In another possible implementation, the processing unit is configured to identify the type of the policy based on an interface through which the policy creation request is received or a message name of the policy creation request, where different types of policies correspond to different message names. The processing unit is further configured to determine the policy type identifier based on the identified type of the policy.

According to a fourth aspect, a communication apparatus is provided. The apparatus includes: a transceiver unit, configured to receive a policy processing request from a first network element, where the policy processing request includes a policy type identifier, and the policy type identifier indicates that a policy is an intent policy or a non-intent policy; and a processing unit, configured to: if the policy is the intent policy, process the intent policy based on the policy processing request. The processing unit is further configured to: if the policy is the non-intent policy, process the non-intent policy based on the policy processing request.

In a possible implementation, the policy processing request further includes a policy expression. The processing unit is configured to generate an intent identifier based on the policy expression. The processing unit is further configured to query an intent knowledge repository based on the policy expression, to obtain a query result. The processing unit is further configured to orchestrate the query result, to obtain an orchestration result, where the orchestration result includes one or more of the following information: an intent executable command, a correspondence between an identifier of an execution device of the intent executable command and a format of the intent executable command, and an intent target fulfillment condition. The processing unit is further configured to indicate, based on the orchestration result, the execution device to execute the intent executable command.

In another possible implementation, the policy processing request further includes a policy expression, and the processing unit is configured to process the non-intent policy based on the policy expression.

According to a fifth aspect, a communication apparatus is provided, including a memory and a processor. The memory stores program instructions, and the processor is configured to invoke the program instructions stored in the memory to perform the method according to any one of the first aspect or the implementations of the first aspect.

According to a sixth aspect, a communication apparatus is provided, including a memory and a processor. The memory stores program instructions, and the processor is configured to invoke the program instructions stored in the memory to perform the method according to any one of the second aspect or the implementations of the second aspect.

According to a seventh aspect, a communication system is provided. The communication system includes the communication apparatus according to any one of the third aspect or the implementations of the third aspect, the communication apparatus according to any one of the fourth aspect or the implementations of the fourth aspect, and a third network element.

According to an eighth aspect, a computer-readable storage medium is provided. The computer-readable storage medium stores instructions. When the instructions are run on a computer, the computer is enabled to perform the method according to any one of the foregoing aspects.

According to a ninth aspect, a computer program product including instructions is provided. When the computer program product runs on a computer, the computer is enabled to perform the method according to any one of the foregoing aspects.

DESCRIPTION OF EMBODIMENTS

Figure 3A:
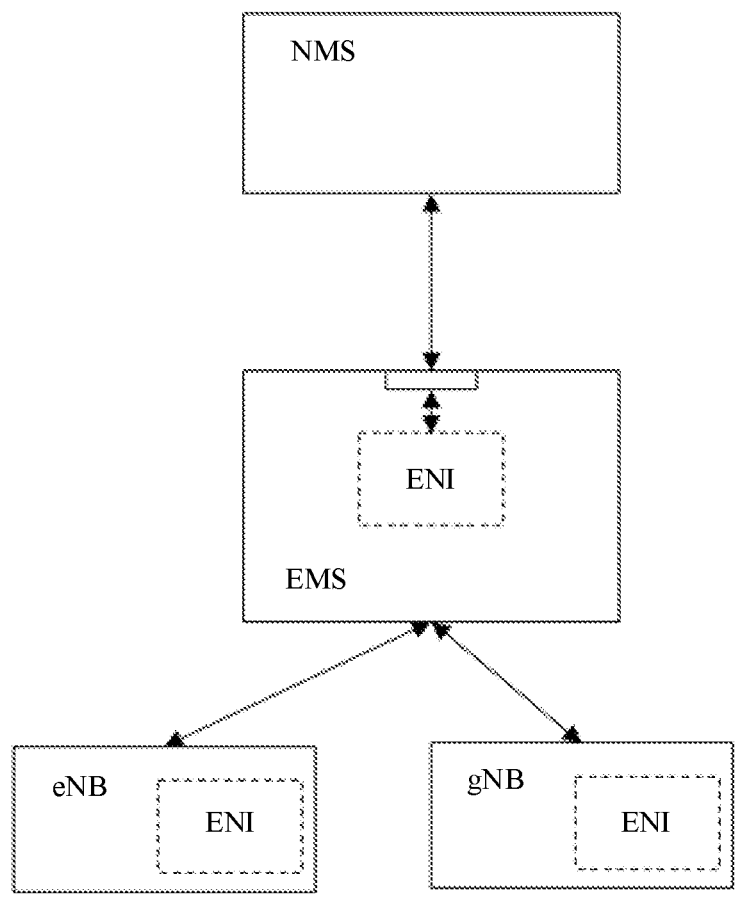
FIG. 3a shows a deployment manner of an intent-based ENI architecture.

An ENI system is a cognitive network management architecture in which a behavior control model is determined based on an observation direction. An intent-based ENI architecture has the following two deployment manners:

FIG. 3a shows a deployment manner of the intent-based ENI architecture. ENI may be a part of a wireless network element, and is deployed in network elements such as an element management system (EMS) and an assisted system (which may also be referred to as network equipment (NE)) (for example, an eNB or a gNB) in a distributed manner.

Figure 3B:
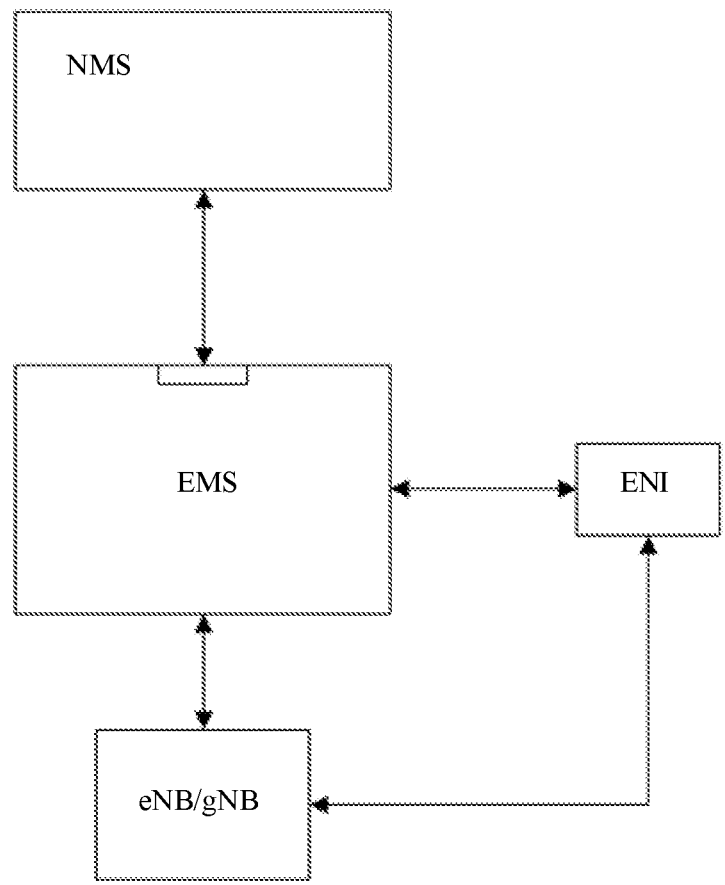
FIG. 3b shows another deployment manner of an intent-based ENI architecture.

FIG. 3b shows another deployment manner of the intent-based ENI architecture. The ENI architecture is deployed as an independent functional module, and network elements such as an EMS and NE establish communication with the ENI architecture through an external interface.

However, in a current intent-based ENI architecture, an interface for inputting an intent policy to the intent-based ENI architecture is the same as an interface for inputting a non-intent policy to the intent-based ENI architecture. Therefore, when a policy is delivered to the ENI architecture through the input interface, the ENI architecture cannot identify a type of the policy. Consequently, an intent policy cannot be correctly translated and executed. In the two deployment manners shown in FIG. 3a and FIG. 3b, after a policy delivered by a network management system (NMS) enters the ENI architecture, the ENI architecture cannot distinguish a type of the policy, and cannot determine whether the policy is an intent policy or a non-intent policy. When the intent-based ENI architecture is applied to a wireless network management system, how the ENI architecture distinguishes a policy delivered by an NMS in the wireless system to implement collaboration between a wireless network and an ENI intelligent module is a problem that needs to be resolved in the present disclosure.

Embodiments of the present disclosure provide a communication method, apparatus, and system. After receiving a policy creation request from a second network element, a first network element can determine a type of a policy requested to be created and indicate a third network element to perform corresponding policy processing. This improves policy execution reliability.

Figure 4:
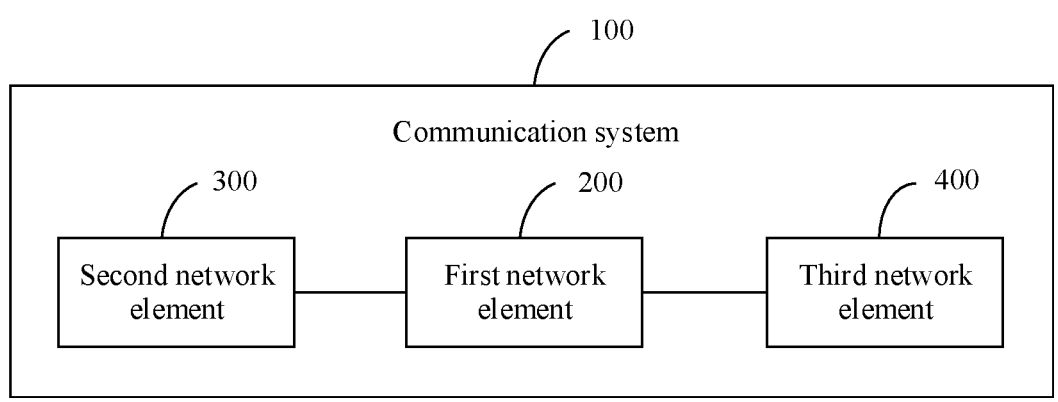
FIG. 4 is a schematic diagram of an architecture of a communication system to which an embodiment of the present disclosure is applicable.

FIG. 4 is a schematic diagram of an architecture of a communication system to which an embodiment of the present disclosure is applicable. The communication system 100 includes a first network element 200, a second network element 300, and a third network element 400. The second network element 300 transmits a created intent to the first network element 200 for execution. The first network element 200 receives the intent from the second network element 300, translates the intent, obtains an intent operation, an intent target, and an execution condition from an intent knowledge repository, performs an operation such as orchestration on the intent to orchestrate the intent into a command that can be executed by the third network element 400, and transmits the command to the third network element 400 for execution. The third network element 400 receives the executable command from the first network element 200, and executes the command. When the communication system is applied to a wireless network management scenario, because the present disclosure mainly relates to procedures of creating and configuring an intent policy, the first network element may be the intent-based ENI architecture shown in FIG. 3a or FIG. 3b, and the first network element may be a module independent of the EMS or a module integrated into the EMS. The second network element is an intent creator, and may be the NMS shown in FIG. 3a or FIG. 3b. The NMS may be a user, an application, and functional entities such as an operation support system and a business support system (operation support system- and business support system-like functionality, oss- and bss-like functionality). The third network element is an entity (infrastructure) of the intent, and may be the NE shown in FIG. 3a or FIG. 3b.

In ENI Release 1, an ENI system includes a total of 10 functional modules (functional block, MODULE), which are classified into four types: input functional modules, output functional modules, analysis functional modules, and decision-making functional modules. Module classification and functions of the various types of modules are described as follows:

The input functional modules include a data input (data ingestion) functional module and a normalization functional module, and are responsible for receiving data from an external system, normalizing the data, and the like.

The output functional modules include an output generation functional module and a denormalization functional module, and are responsible for converting an internal command in the system into a format that can be processed by the external system and sending the converted command to the external system.

The analysis functional modules include a knowledge management functional module, a context awareness functional module, and a cognition management functional module, and are responsible for sensing and analyzing a current network status and predicting a future network status.

The decision-making functional modules include a policy management functional module, a situational awareness functional module, and a model-driven engineering functional module, and generate, based on network status awareness, anew policy based on a policy target, orchestrate the policy, and send an operation command to an output module.

Figure 5:
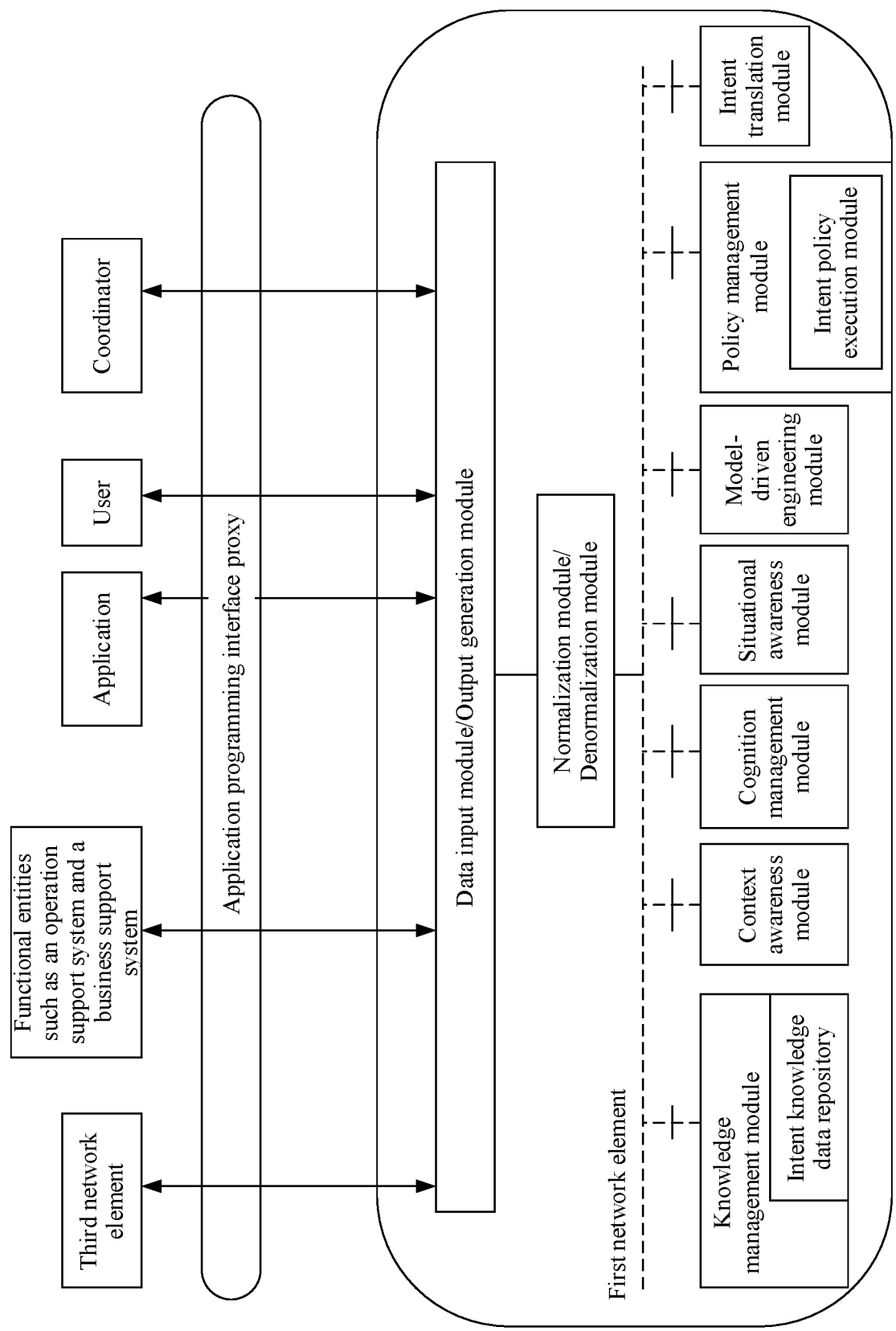
FIG. 5 is a schematic diagram of an intent-based ENI converged architecture.

In ENI Release 2, an intent-based ENI converged architecture is defined. Based on the ENI architecture defined in ENI Release 1, in ENI Release 2, functional modules related to intent translation and intent assurance are defined. FIG. 5 is a schematic diagram of the intent-based ENI converged architecture. Specifically, in the ENI converged architecture, an intent knowledge repository is added to the knowledge management functional module, an intent policy execution (intent policy fulfillment) sub-functional module is added to the policy management functional module, and an intent translation functional module is further introduced. The intent translation functional module may be deployed with the policy management functional module in an integrated manner. Alternatively, the intent translation functional module may be used as a part of the policy management functional module.

The intent translation functional module is configured to translate a received intent policy into a command that can be recognized by an ENI internal system.

The intent knowledge repository is configured to store expert experience and network element information, and may be used as an independent functional module or placed in the knowledge management functional module in an existing ENI architecture.

The intent policy execution functional module is configured to execute and maintain an intent, orchestrate an intent policy, and continuously meet an intent requirement of the external system.

Specifically, the intent-based ENI converged system supports intent translation and assurance. The EMS may perform the foregoing operation process through two phases: an intent translation phase and an intent execution and completion phase. An intent translation module and a policy management module are involved in the intent translation phase. A situational awareness module, a cognition management module, a context awareness module, and an MDE module are involved in the intent execution and completion phase. In the intent translation phase, after the NMS delivers a request for implementing an intent to the EMS, during translation, the intent translation module queries the intent knowledge repository (where the intent knowledge repository may be located in the knowledge management functional module) to obtain an intent operation, an intent target, and an execution condition, and the policy management module executes the intent. In an intent assurance phase, the policy management module may change the intent operation based on network status information, an intent fulfillment situation, and an intent policy update situation.

Figure 1:
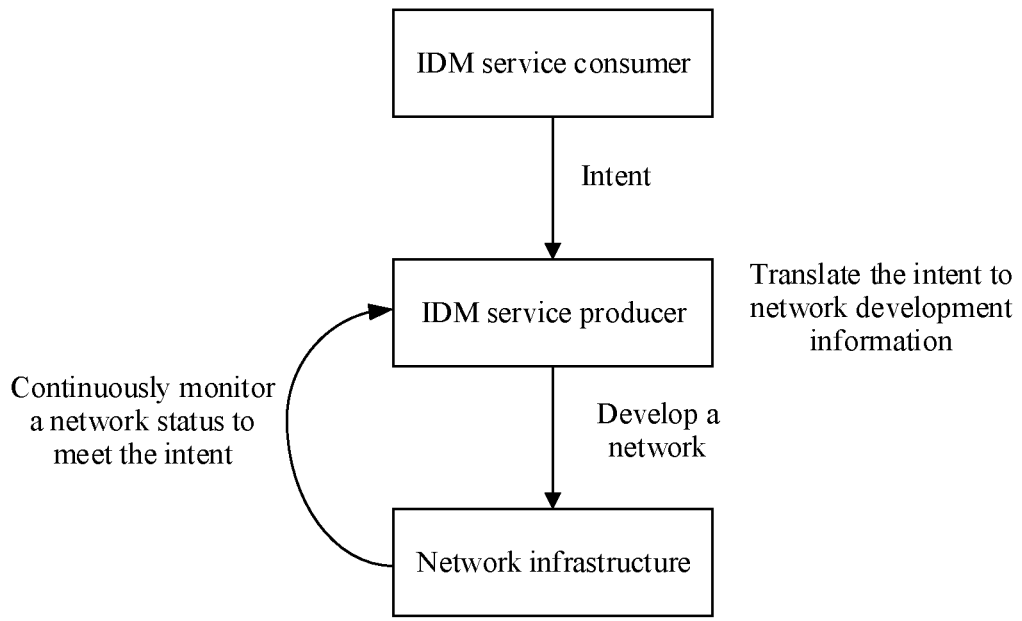
FIG. 1 is a schematic diagram of an architecture of an IDMS.
Figure 2A:
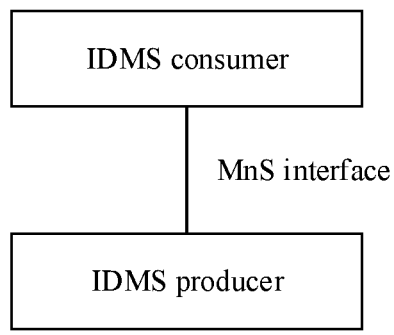
FIG. 2a is a schematic diagram of a manner in which an IDMS consumer delivers an intent policy to an IDMS producer.
Figure 2B:
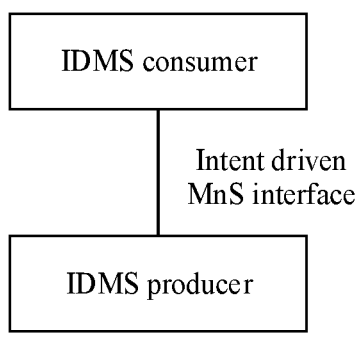
FIG. 2b is a schematic diagram of another manner in which an IDMS consumer delivers an intent policy to an IDMS producer.
Figure 6:
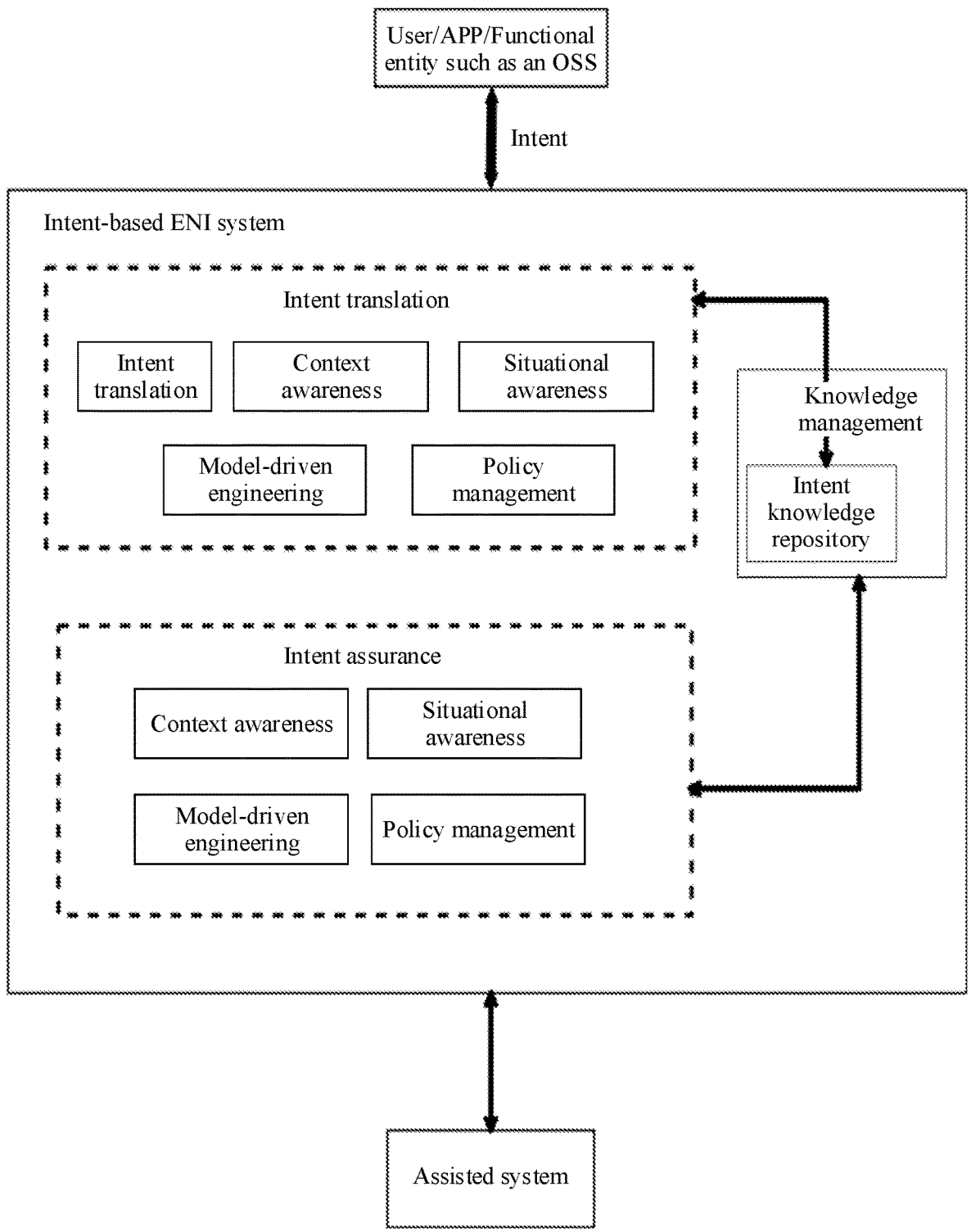
FIG. 6 is a schematic diagram of functional modules involved in intent translation and assurance phases when the IDM system shown in FIG. 1 is applied to network device management.

FIG. 6 is a schematic diagram of functional modules involved in intent translation and assurance phases when the IDM system shown in FIG. 1 is applied to network device management. In an architecture of an intent-based ENI converged system (which is the EMS in FIG. 4), intent translation and assurance are supported. In the field of network device management, functional modules of the ENI may be embedded into an element management system (EMS). A network management system (NMS) sends an intent to the EMS. The EMS translates and executes the intent, and sends a finally generated command to an assisted system (which may also be referred to as network equipment (NE)). After the NE executes the command, the intent is finally fulfilled. The NMS may be a user, an application, and functional entities such as an operation support system and a business support system (operation support system- and business support system-like functionality, oss- and bss-like functionality).

Specifically, in the intent translation phase, after the NMS delivers a request for implementing an intent to an intent converged system, an intent translation functional module queries an intent knowledge repository to obtain an intent operation, an intent fulfillment condition (intent fulfillment criterion) (also referred to as an intent target), and an execution condition that are related to the intent, and a policy management module executes the intent.

In the intent assurance phase, the policy management module exchanges network status information, an intent fulfillment situation, and an intent policy update situation with a situational awareness module, a cognition management module, a context awareness module, and an MDE module, to change the intent operation.

With reference to FIG. 1 to FIG. 11, the communication method provided in embodiments of the present disclosure is described in detail below.

Figure 7:
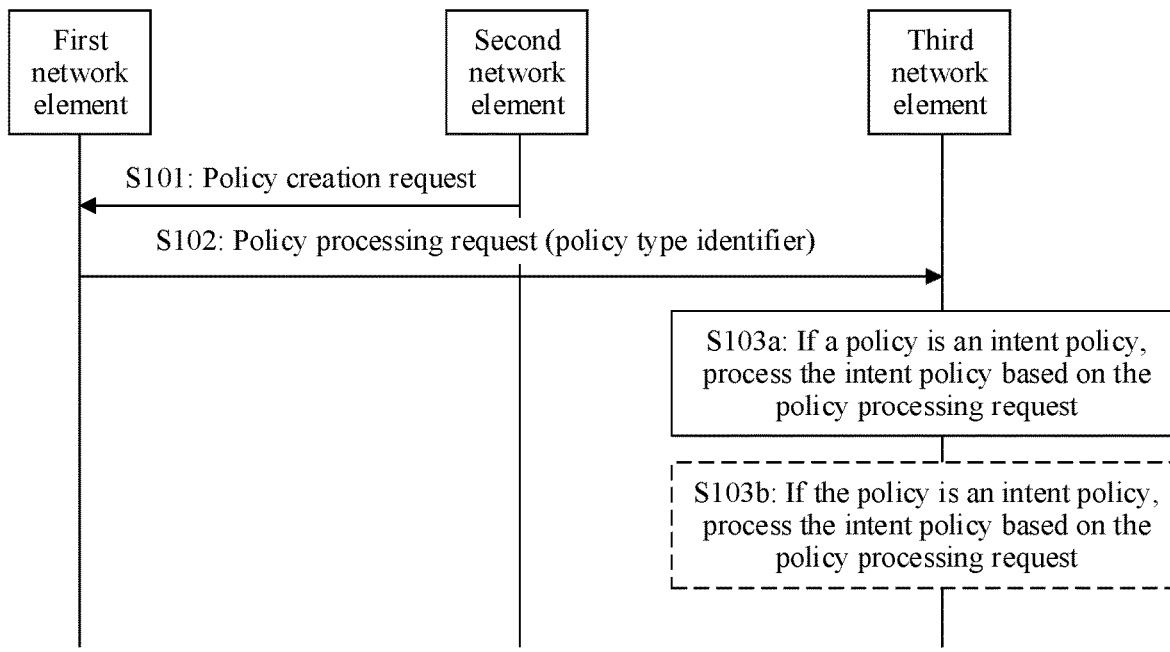
FIG. 7 is a schematic flowchart of a communication method according to an embodiment of the present disclosure.

FIG. 7 is a schematic flowchart of a communication method according to an embodiment of the present disclosure. For example, the method includes the following steps.

S101: A second network element sends a policy creation request to a first network element.

Correspondingly, the first network element receives the policy creation request.

When the second network element expects a third network element to execute a policy, the second network element sends the policy creation request to the first network element, to request the first network element to create the policy in the third network element. A type of the policy requested to be created includes an intent policy or a non-intent policy. The intent policy indicates that the second network element delivers an intent. To be specific, the intent policy indicates what the second network element expects the third network element to do (do what). Specifically (for how to do), the first network element translates and orchestrates the intent to obtain the intent policy (an intent operation, an intent target, and an execution condition), and then sends the intent operation in the intent policy to the third network element for execution. The non-intent policy refers to a policy other than the intent policy.

S102: The first network element sends a policy processing request to the third network element, where the policy processing request includes a policy type identifier, and the policy type identifier indicates that the policy is the intent policy or the non-intent policy.

Correspondingly, the third network element receives the policy processing request.

After receiving the policy creation request sent by the second network element, the first network element identifies the type of the policy requested to be created by using the policy creation request. To be specific, the first network element identifies whether the intent policy or the non-intent policy is requested to be created by using the policy creation request. If the policy creation request is a request for creating the intent policy, the first network element translates and orchestrates the intent to obtain the intent policy (the intent operation, the intent target, and the execution condition), determines a policy type identifier identifying the intent policy, and sends a policy processing request to the third network element, where the policy processing request includes the intent operation and the policy type identifier, and the policy type identifier is used to identify that the policy is the intent policy. If the policy creation request is a request for creating the non-intent policy, the first network element sends a policy processing request to the third network element, where the policy processing request includes a policy type identifier, and the policy type identifier is used to identify that the policy is the non-intent policy.

S103a: If the policy is the intent policy, the third network element processes the intent policy based on the policy processing request.

Specifically, the third network element receives the policy processing request. Based on the policy type identifier carried in the policy processing request, if the policy type identifier identifies the intent policy, the third network element performs the foregoing intent operation.

S103b: If the policy is the non-intent policy, the third network element processes the non-intent policy based on the policy processing request.

Specifically, the third network element receives the policy processing request. Based on the policy type identifier carried in the policy processing request, if the policy type identifier identifies the non-intent policy, the third network element performs a non-intent operation.

It may be understood that the third network element selects, based on the policy processing request sent by the first network element, one of step S103a and step S103b to perform.

According to the communication method provided in the present disclosure, after receiving the policy creation request from the second network element, the first network element can determine the type of the policy requested to be created, and indicate the third network element to perform corresponding policy processing. This improves policy execution reliability.

Figure 8:
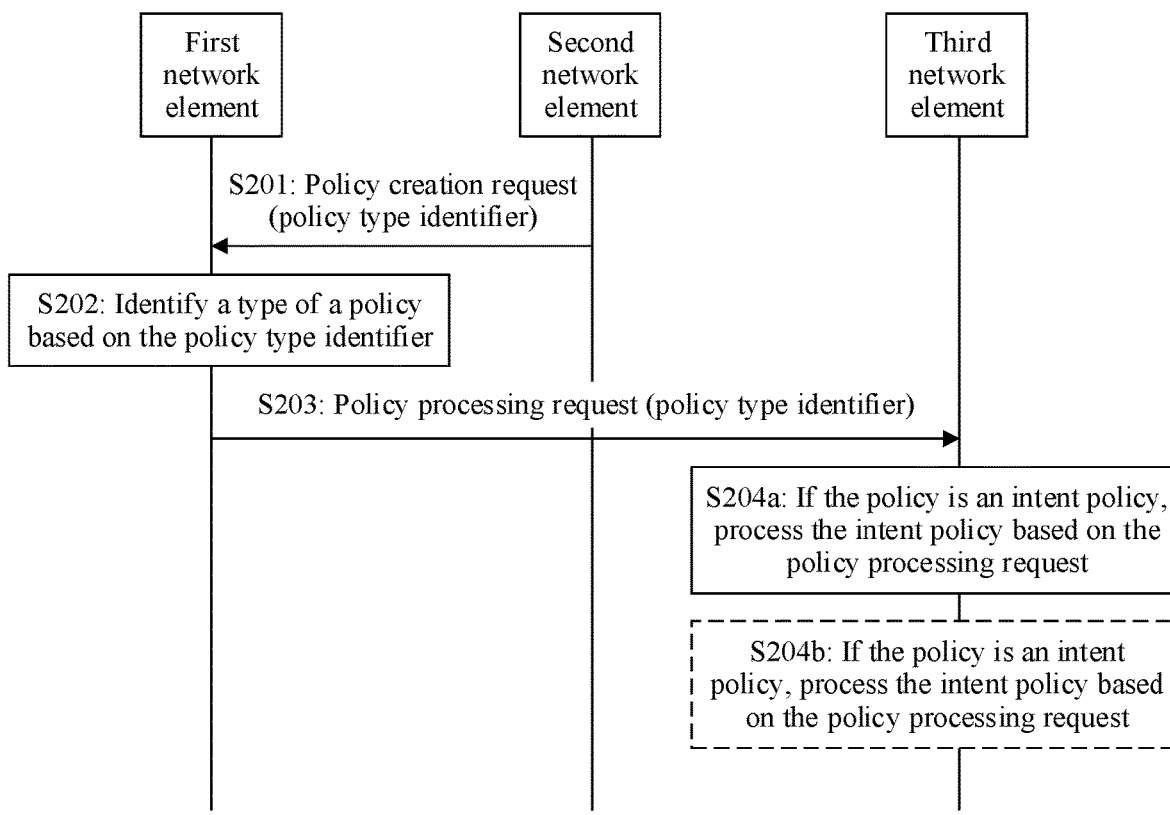
FIG. 8 is another schematic flowchart of a communication method according to an embodiment of the present disclosure.

FIG. 8 is another schematic flowchart of a communication method according to an embodiment of the present disclosure. For example, the method includes the following steps.

S201: A second network element sends a policy creation request to a first network element, where the policy creation request includes a policy type identifier.

Correspondingly, the first network element receives the policy creation request.

The second network element sends the policy creation request to the first network element. There are two types of requests. If the policy creation request is a request for creating an intent policy, an implementIntent Invoking (policyExpression, flag) message is sent. Alternatively, if the policy creation request is a request for creating a non-intent policy, a Configuration Message (policyExpression, flag) message is sent. A message name is an intent execution invoking (implementIntent Invoking) message, and the message includes two parameters/information elements: policyExpression and flag. policyExpression is a policy expression. flag is the policy type identifier used to identify that a policy requested to be created is the intent policy or the non-intent policy. flag may be included in policyExpression. Alternatively, flag may be included in a separate information element in the policy creation request.

A communication system may use the architecture shown in FIG. 3a. To be specific, ENI is deployed in an EMS. After receiving the policy creation request, the EMS transmits the policy creation request to an ENI module in the EMS for processing.

Alternatively, the communication system may use the architecture shown in FIG. 3b. To be specific, the ENI is deployed independently of the EMS. After receiving the policy creation request, the EMS forwards the policy creation request to the ENI.

S202: The first network element identifies a type of the policy based on the policy type identifier.

After receiving the policy creation request, the first network element may identify, based on flag carried in the policy creation request, that the policy is the intent policy or the non-intent policy.

S203: The first network element sends a policy processing request to a third network element, where the policy processing request includes the policy type identifier, and the policy type identifier indicates that the policy is the intent policy or the non-intent policy.

Correspondingly, the third network element receives the policy processing request.

After identifying the type of the policy, the first network element has different policy processing procedures for different types of policies. Specifically, if the policy is the intent policy, the first network element sends the policy processing request to the third network element, to indicate the third network element to process the policy according to a procedure of processing an intent policy shown in FIG. 9. If the policy is the non-intent policy, the first network element sends the policy processing request to the third network element, to indicate the third network element to process the policy according to a procedure of processing a non-intent policy shown in FIG. 10.

S204a: If the policy is the intent policy, the third network element processes the intent policy based on the policy processing request.

Specifically, the third network element receives the policy processing request. Based on the policy type identifier carried in the policy processing request, if the policy type identifier identifies the intent policy, the third network element performs an intent operation.

S204b: If the policy is the non-intent policy, the third network element processes the non-intent policy based on the policy processing request.

Specifically, the third network element receives the policy processing request. Based on the policy type identifier carried in the policy processing request, if the policy type identifier identifies the non-intent policy, the third network element performs a non-intent operation.

It may be understood that the third network element selects, based on the policy processing request sent by the first network element, one of step S204a and step S204b to perform.

The procedure of processing an intent policy and the procedure of processing a non-intent policy are described in detail below.

Figure 9:
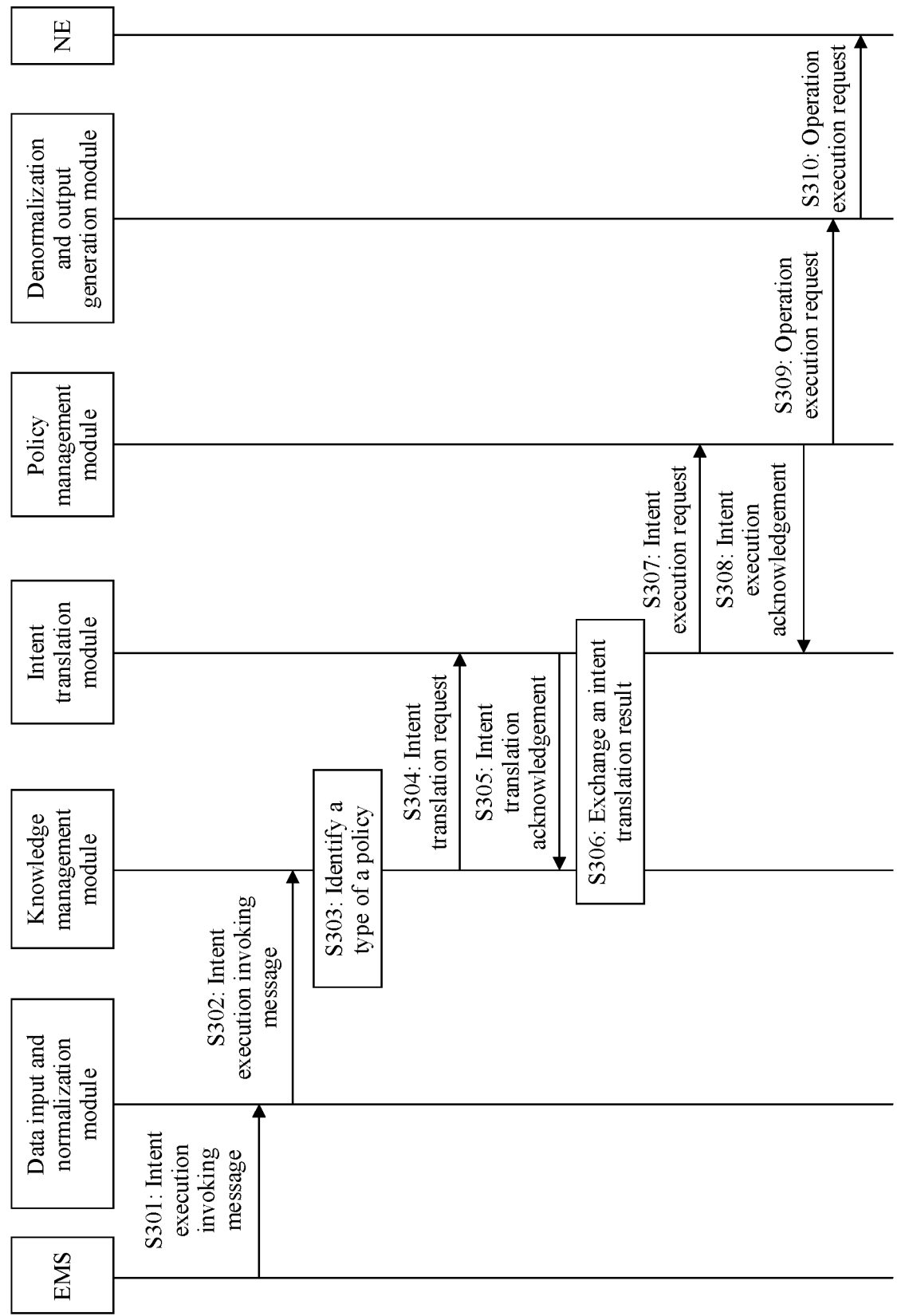
FIG. 9 is a schematic flowchart of processing an intent policy.

As shown in FIG. 9, it is assumed that the communication system uses the architecture shown in FIG. 3b. To be specific, the ENI is deployed independently of the EMS. The procedure of processing an intent policy includes the following steps.

S301: The EMS sends the intent execution invoking (implementIntent Invoking) message to a data input and normalization module in an ENI architecture, where the message includes two parameters/information elements: flag and policyExpression.

S302: After receiving the intent execution invoking message, the data input and normalization module forwards the intent execution invoking message to a knowledge management module.

S303: The knowledge management module checks flag in the intent execution invoking message, where flag is an identifier of the intent policy.

S304: When identifying the intent policy to be executed, the knowledge management module sends an intent translation request ((policyExpression)) message to an intent translation module.

S305: After receiving the intent translation request, the intent translation module generates an intent identifier (intentId), and sends an intent translation acknowledge message to the knowledge management module, to indicate that the intent translation request is received.

S306: The intent translation module interacts with the knowledge management module, and the intent translation module performs lexical and syntax analysis on policyExpression, to obtain an intent keyword. The intent translation module queries an intent knowledge repository in the knowledge management module based on the intent keyword, to obtain a query result, and orchestrates the query result to obtain a plurality of groups of intent executable commands: intentInstruction{<executionCondition, Instruction>}, a set of correspondences between identifiers (entityId) of execution devices of the intent executable commands and formats of the executable commands: entityId_FormatList{<entityId, format>}, and an intent fulfillment condition (also referred to as an "intent target") (fulfillmentCriterion).

S307: The intent translation module sends an intent execution request (intent execution request (intentId, entityId_FormatList{<entityId, format>}, intentInstruction{<executionCondition, Instruction>})) message to a policy management module.

S308: The policy management module sends an intent execution acknowledge message to the intent translation module, where the intent execution acknowledge message indicates that the intent execution request message is received.

S309: The policy management module sends an operation execution request (instruction execution request (instruction, entityId_FormatList)) message to a denormalization and output generation module.

S310: The denormalization and output generation module performs format conversion on the instruction based on entityId_FormatList included in the operation execution request message, to convert the instruction into an executable command (convertedInstruction). Then, the operation execution request message is forwarded to a network element indicated by entityId in entityId_FormatList, where the message includes convertedInstruction.

Figure 10:
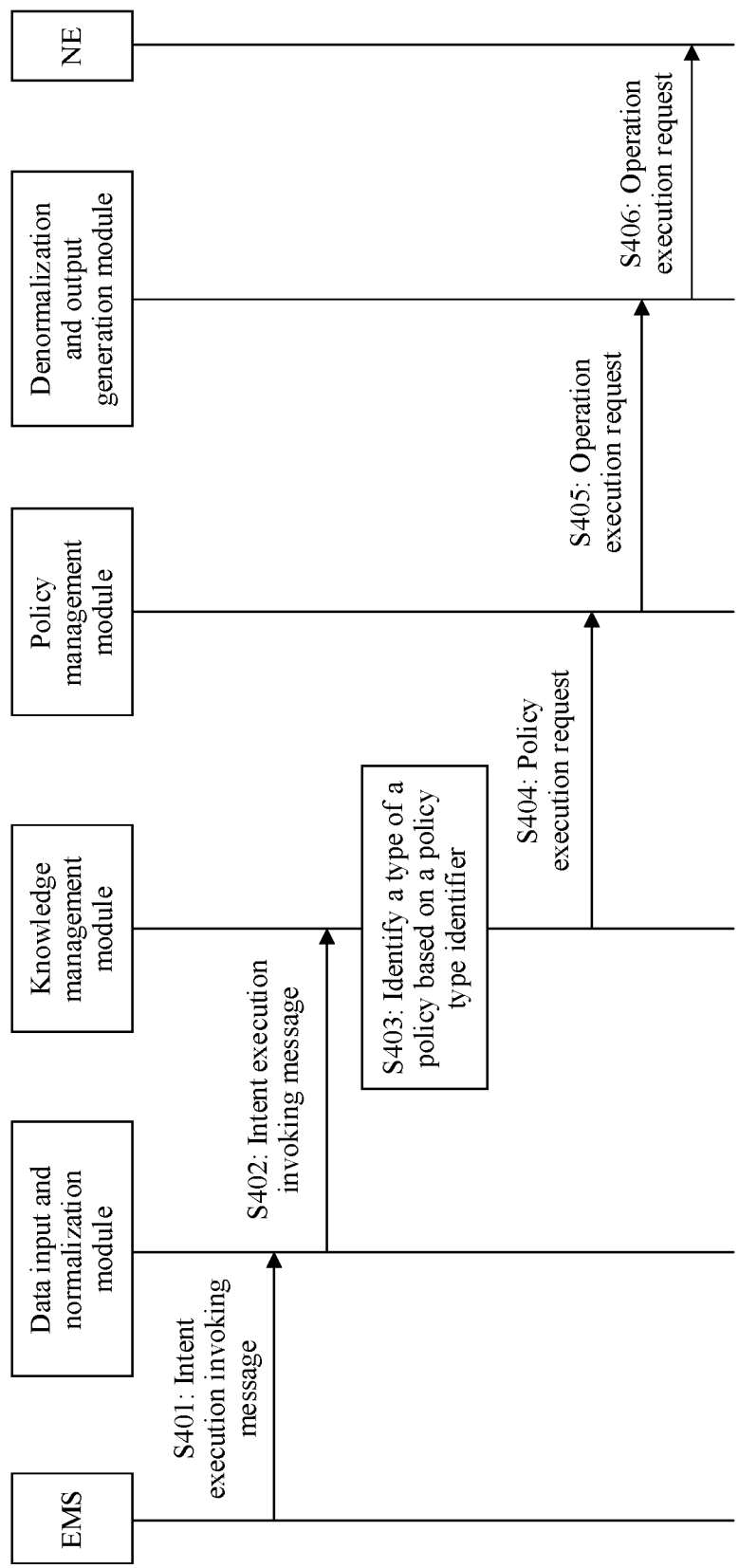
FIG. 10 is a schematic flowchart of processing a non-intent policy.

As shown in FIG. 10, it is assumed that the communication system uses the architecture shown in FIG. 3b. To be specific, the ENI is deployed independently of the EMS. The procedure of processing a non-intent policy includes the following steps.

S401: The EMS sends the intent execution invoking (implementIntent Invoking) message to a data input and normalization module in an ENI architecture, where the message includes two parameters/information elements: flag and policyExpression.

S402: The data input and normalization module forwards the intent execution invoking message to a knowledge management module.

S403: The knowledge management module checks flag in the intent execution invoking message, where flag is an identifier of the non-intent policy.

S404: The knowledge management module sends a policy execution request (policy execution request (policyExpression, entityId_FormatList)) message to a policy management module.

S405: The policy management module sends an operation execution request (instruction execution request (instruction, entityId_FormatList)) message to a denormalization and output generation module.

S406: The denormalization and output generation module performs format conversion on the instruction based on entityId_FormatList included in the operation execution request message, to convert the instruction into convertedInstruction. Then, the operation execution request message is sent to a network element indicated by entityId in entityId_FormatList, where the message includes convertedInstruction.

It can be learned by comparing the procedure of processing an intent policy shown in FIG. 9 and the procedure of processing a non-intent policy shown in FIG. 10 that, intent translation and orchestration performed by the intent translation module are not involved in the procedure of processing a non-intent policy. To be specific, steps S304 to S306 shown in FIG. 9 are not involved in the procedure of processing a non-intent policy.

According to the communication method provided in the present disclosure, after the first network element receives the policy creation request from the second network element, because the policy creation request includes the policy type identifier, the first network element can determine, based on the policy type identifier, the type of the policy requested to be created, and indicate the third network element to perform corresponding policy processing. This improves policy execution reliability.

Figure 11:
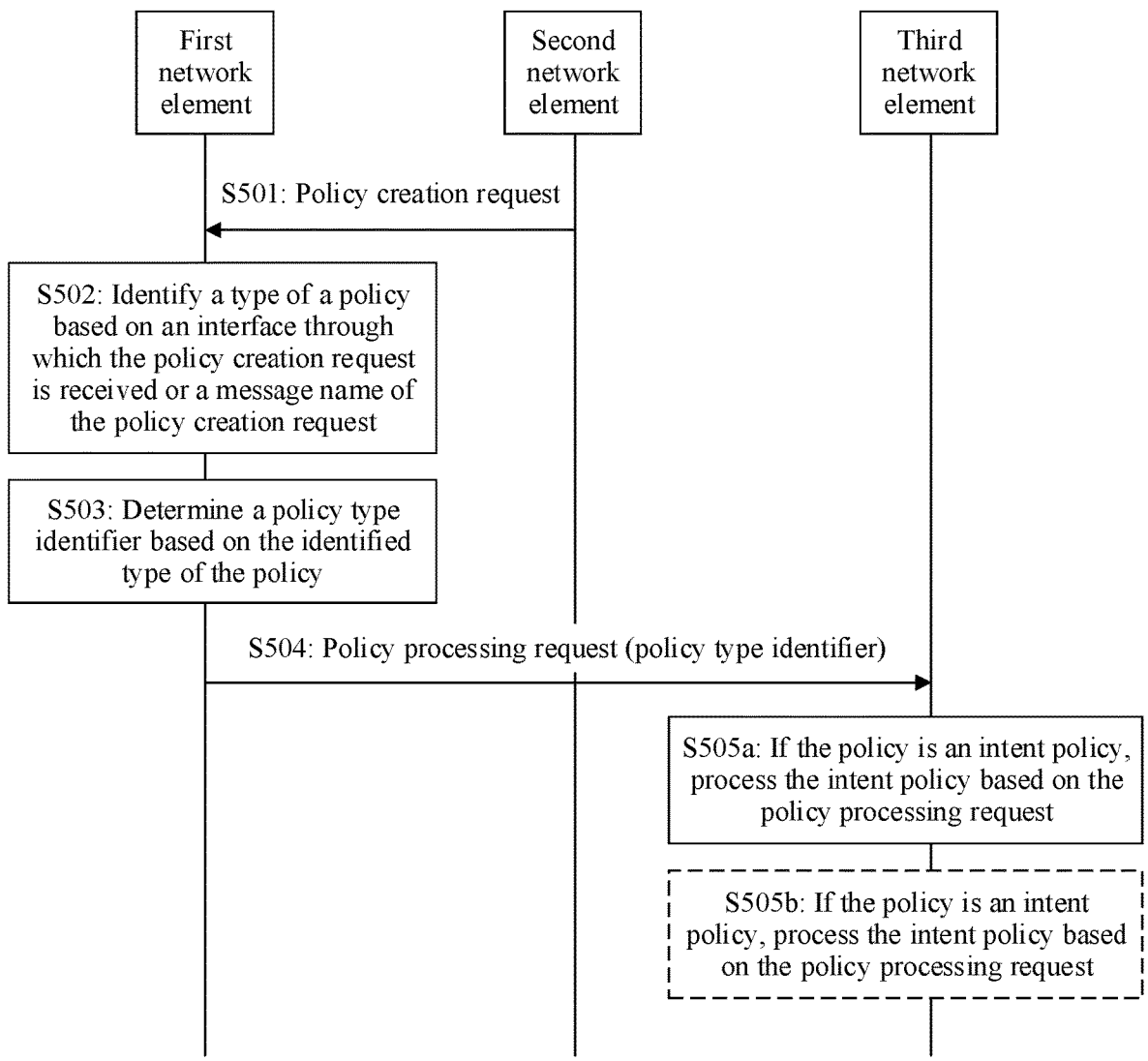
FIG. 11 is another schematic flowchart of a communication method according to an embodiment of the present disclosure.

FIG. 11 is another schematic flowchart of a communication method according to an embodiment of the present disclosure. For example, the method includes the following steps.

S501: A second network element sends a policy creation request to a first network element, where a type of a policy requested to be created includes an intent policy or a non-intent policy.

Correspondingly, the first network element receives the policy creation request.

The second network element sends the policy creation request to the first network element. There are two types of requests. If the policy creation request is a request for creating the intent policy, an implementIntent Invoking (policyExpression) message is sent. Alternatively, if the policy creation request is a request for creating the non-intent policy, a Configuration Message (policyExpression) message is sent. A message name is an intent execution invoking (implementIntent Invoking) message, and the message includes policyExpression. The second network element may further send policy creation requests through different physical interfaces or different logical interfaces.

A communication system may use the architecture shown in FIG. 3a. To be specific, ENI is deployed in an EMS. After receiving the policy creation request, the EMS transmits the policy creation request to an ENI module in the EMS for processing.

Alternatively, the communication system may use the architecture shown in FIG. 3b. To be specific, the ENI is deployed independently of the EMS. After receiving the policy creation request, the EMS forwards the policy creation request to the ENI.

S502: The first network element identifies the type of the policy based on an interface through which the policy creation request is received or a message name of the policy creation request.

The second network element may send policy creation requests through different physical interfaces or different logical interfaces, and the first network element may identify, based on different interfaces through which the policy creation requests are received, types of policies requested to be created by using the policy creation requests. Alternatively, for different types of policies, message names of policy creation requests sent by the second network element are different, and the first network element may identify the types of the policies based on the message names of the policy creation requests. For example, if the policy is the intent policy, the second network element sends the implementIntent invoking message. Alternatively, if the policy is the non-intent policy, the second network element sends the configuration message.

S503: The first network element determines a policy type identifier based on the identified type of the policy.

Specifically, if the first network element identifies that the policy is the intent policy, the first network element determines that the policy type identifier is an identifier of the intent policy. For example, the identifier of the intent policy is represented by flag1. If the first network element identifies that the policy is the non-intent policy, the first network element determines that the policy type identifier is an identifier of the non-intent policy. For example, the identifier of the non-intent policy is represented by flag2.

S504: The first network element sends a policy processing request to a third network element, where the policy processing request includes the policy type identifier, and the policy type identifier indicates that the policy is the intent policy or the non-intent policy.

Correspondingly, the third network element receives the policy processing request.

After identifying the type of the policy, the first network element has different policy processing procedures for different types of policies. Specifically, if the policy is the intent policy, the first network element sends the policy processing request to the third network element, to indicate the third network element to process the policy according to the procedure of processing an intent policy shown in FIG. 9. If the policy is the non-intent policy, the first network element sends the policy processing request to the third network element, to indicate the third network element to process the policy according to the procedure of processing a non-intent policy shown in FIG. 10.

S505a: If the policy is the intent policy, the third network element processes the intent policy based on the policy processing request.

Specifically, the third network element receives the policy processing request. Based on the policy type identifier carried in the policy processing request, if the policy type identifier identifies the intent policy, the third network element performs an intent operation.

S505b: If the policy is the non-intent policy, the third network element processes the non-intent policy based on the policy processing request.

Specifically, the third network element receives the policy processing request. Based on the policy type identifier carried in the policy processing request, if the policy type identifier identifies the non-intent policy, the third network element performs a non-intent operation.

It may be understood that the third network element selects, based on the policy processing request sent by the first network element, one of step S505a and step S505b to perform.

According to the communication method provided in the present disclosure, after receiving the policy creation request from the second network element, the first network element can determine, based on the interface through which the policy creation request is received or the message name of the policy creation request, the type of the policy requested to be created, and indicate the third network element to perform corresponding policy processing. This improves policy execution reliability.

Figure 12:
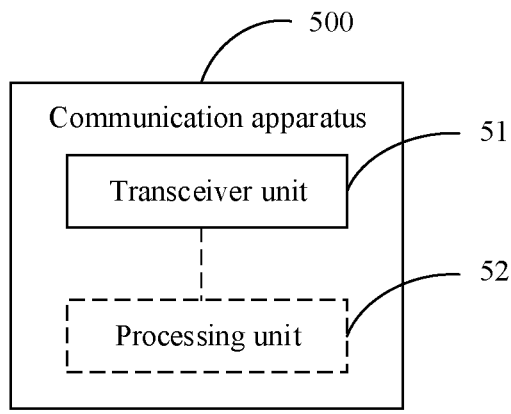
FIG. 12 is a schematic diagram of a structure of a communication apparatus according to an embodiment of the present disclosure.

Based on a same concept as the foregoing communication method, as shown in FIG. 12, an embodiment of the present disclosure further provides a communication apparatus. The communication apparatus 500 includes a transceiver unit 51, and may further include a processing unit 52 (represented by a dashed line in the figure).

The transceiver unit 51 is configured to receive a policy creation request from a second network element, where a type of a policy requested to be created includes an intent policy or a non-intent policy. The transceiver unit 51 is further configured to send a policy processing request to a third network element, where the policy processing request includes a policy type identifier, and the policy type identifier indicates that the policy is the intent policy or the non-intent policy.

In a possible implementation, the processing unit 52 is configured to identify the type of the policy based on the policy creation request.

In another possible implementation, the policy creation request includes the policy type identifier. The processing unit 52 is configured to identify the type of the policy based on the policy type identifier.

In another possible implementation, the policy creation request further includes a policy expression, and the policy type identifier is included in the policy expression, or the policy type identifier is included in a separate information element in the policy creation request.

In another possible implementation, the processing unit 52 is configured to identify the type of the policy based on an interface through which the policy creation request is received or a message name of the policy creation request, where different types of policies correspond to different message names. The processing unit 52 is further configured to determine the policy type identifier based on the identified type of the policy.

For implementations of the transceiver unit 51 and the processing unit 52, refer to related descriptions of the first network element in FIG. 7 to FIG. 11.

According to the communication apparatus provided in this embodiment of the present disclosure, after receiving the policy creation request from the second network element, the communication apparatus can determine the type of the policy requested to be created, and indicate the third network element to perform corresponding policy processing. This improves policy execution reliability.

Figure 13:
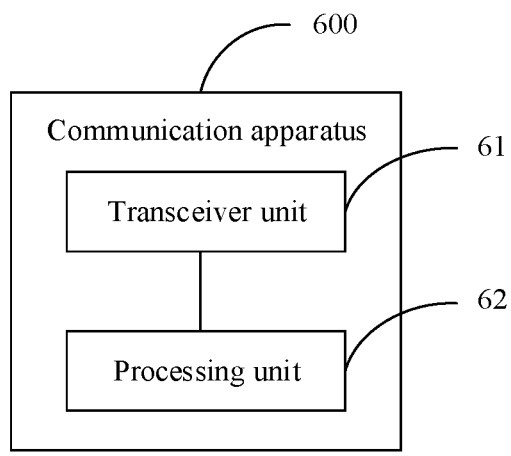
FIG. 13 is another schematic diagram of a structure of a communication apparatus according to an embodiment of the present disclosure.

Based on a same concept as the foregoing communication method, as shown in FIG. 13, an embodiment of the present disclosure further provides a communication apparatus. The communication apparatus 600 includes a transceiver unit 61 and a processing unit 62.

The transceiver unit 61 is configured to receive a policy processing request from a first network element, where the policy processing request includes a policy type identifier, and the policy type identifier indicates that a policy is an intent policy or a non-intent policy. The processing unit 62 is configured to: if the policy is the intent policy, process the intent policy based on the policy processing request. The processing unit 62 is further configured to: if the policy is the non-intent policy, process the non-intent policy based on the policy processing request.

In a possible implementation, the policy processing request further includes a policy expression. The processing unit 62 is configured to generate an intent identifier based on the policy expression. The processing unit 62 is further configured to query an intent knowledge repository based on the policy expression, to obtain a query result. The processing unit 62 is further configured to orchestrate the query result, to obtain an orchestration result, where the orchestration result includes one or more of the following information: an intent executable command, a correspondence between an identifier of an execution device of the intent executable command and a format of the intent executable command, and an intent target fulfillment condition. The processing unit 62 is further configured to indicate, based on the orchestration result, the execution device to execute the intent executable command.

In another possible implementation, the policy processing request further includes a policy expression. The processing unit 62 is configured to process the non-intent policy based on the policy expression.

For implementations of the transceiver unit 61 and the processing unit 62, refer to related descriptions of the third network element in FIG. 7 to FIG. 11.

According to the communication apparatus provided in this embodiment of the present disclosure, the communication apparatus receives the policy processing request from the first network element, and the first network element clearly indicates the policy type identifier in the policy processing request, so that the communication apparatus may perform different processing procedures based on different types of policies. This improves policy execution reliability.

Figure 14:
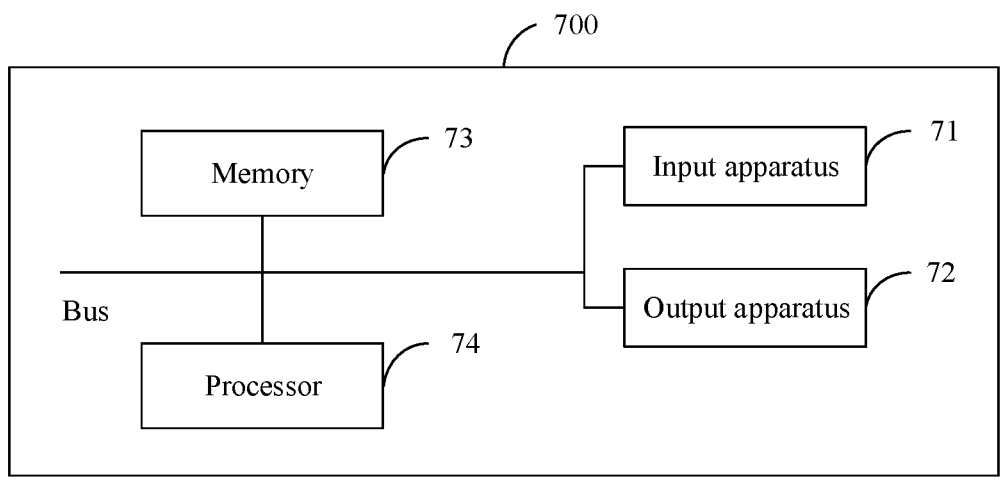
FIG. 14 is another schematic diagram of a structure of a communication apparatus according to an embodiment of the present disclosure.

As shown in FIG. 14, a schematic diagram of a structure of hardware of a communication apparatus is further provided. The communication apparatus is configured to perform the foregoing communication method. A part or all of the foregoing methods may be implemented through hardware, or may be implemented through software or firmware.

Optionally, in an implementation, the communication apparatus may be a chip or an integrated circuit.

Optionally, when a part or all of the communication methods in the foregoing embodiments are implemented through software or firmware, the communication method may be implemented by the communication apparatus 700 provided in FIG. 14. As shown in FIG. 14, the communication apparatus 700 may include:

a memory 73 and a processor 74 (where there may be one or more processors 74 in the apparatus, and one processor is used as an example in FIG. 14). The communication apparatus may further include an input apparatus 71 and an output apparatus 72. In this embodiment, the input apparatus 71, the output apparatus 72, the memory 73, and the processor 74 may be connected through a bus or in another manner. In FIG. 14, an example in which connection is implemented through the bus is used.

In an embodiment, the processor 74 is configured to perform method steps performed by the first network element in FIG. 7 to FIG. 11.

In another embodiment, the processor 74 is configured to perform method steps performed by the third network element in FIG. 7 to FIG. 11.

Optionally, a program of the foregoing communication method may be stored in the memory 73. The memory 73 may be a physically independent unit. Alternatively, the memory 73 may be integrated with the processor 74. The memory 73 may also be configured to store data.

Optionally, when a part or all of the communication methods in the foregoing embodiments are implemented through software, the communication apparatus may alternatively include only the processor. The memory configured to store the program is located outside the communication apparatus. The processor is connected to the memory through a circuit or a wire, and is configured to read and execute the program stored in the memory.

The processor may be a central processing unit (CPU), a network processor (NP), or a WLAN device.

The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

A person skilled in the art should understand that one or more embodiments of this disclosure may be provided as a method, a system, or a computer program product. Therefore, the one or more embodiments of this disclosure may use a form of a hardware-only embodiment, a software-only embodiment, or an embodiment with a combination of software and hardware. Moreover, the one or more embodiments of this disclosure may be implemented in a form of a computer program product that is implemented on one or more computer-usable storage media (including but not limited to a disk memory, a CD-ROM, an optical memory, and the like) that include computer-usable program code.

An embodiment of the present disclosure further provides a computer-readable storage medium. The storage medium may store a computer program. When the program is executed by a processor, the steps of the communication method described in any embodiment of this disclosure are implemented.

An embodiment of the present disclosure further provides a computer program product including instructions. When the computer program product runs on a computer, the computer is enabled to perform the steps of the communication method described in any embodiment of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, division into the units is merely logical function division and may be other division during actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units. To be specific, the units may be located in one position, or may be distributed on a plurality of network units. A part or all of the units may be selected based on actual requirements to achieve the objectives of the solutions of embodiments.

A part or all of the foregoing embodiments may be implemented through software, hardware, firmware, or any combination thereof. When software is used to implement the embodiments, a part or all of the embodiments may be implemented in a form of a computer program product. The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, or another programmable apparatus. The computer instructions may be stored in a computer-readable storage medium, or transmitted using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM); a random access memory (RAM); a magnetic medium, for example, a floppy disk, a hard disk, a magnetic tape, or a magnetic disk; an optical medium, for example, a digital versatile disc (DVD); or a semiconductor medium, for example, a solid state disk (SSD).

What is claimed is:

1. A communication method performed by a first network element having a processor and a memory, the method comprising:
   receiving a policy creation request from a second network element, wherein a type of a policy requested to be created comprises an intent policy or a non-intent policy; and
   sending a policy processing request to a third network element, wherein the policy processing request comprises a policy type identifier, and the policy type identifier indicates that the policy is the intent policy or the non-intent policy.

2. The method according to claim 1, further comprising:
   identifying the type of the policy based on the policy creation request.

3. The method according to claim 2, wherein the policy creation request comprises the policy type identifier, and the identifying the type of the policy based on the policy creation request comprises:
   identifying the type of the policy based on the policy type identifier.

4. The method according to claim 3, wherein the policy creation request further comprises a policy expression, and the policy type identifier is comprised in the policy expression.

5. The method according to claim 3, wherein the policy creation request further comprises a policy expression, and the policy type identifier is comprised in a separate information element in the policy creation request.

6. The method according to claim 2, wherein the identifying the type of the policy based on the policy creation request comprises:
   identifying the type of the policy based on an interface through which the policy creation request is received; and
   wherein the method further comprises:
      determining the policy type identifier based on the identified type of the policy.

7. The method according to claim 2, wherein the identifying, the type of the policy based on the policy creation request comprises:
   identifying the type of the policy based on a message name of the policy creation request, wherein different types of policies correspond to different message names; and
   wherein the method further comprises:
      determining the policy type identifier based on the identified type of the policy.

8. The method according to claim 1, wherein both the intent policy and the non-intent policy are provided by the second network element.

9. The first network element according to claim 8, wherein the policy creation request comprises the policy type identifier, and
   wherein the identifying the type of the policy based on the policy creation request comprises:
   identifying the type of the policy based on the policy type identifier.

10. The first network element according to claim 8, wherein the identifying the type of the policy based on the policy creation request comprises:
    Identifying the type of the policy based on an interface through which the policy creation request is received; and
    wherein the method further comprises:
       determining the policy type identifier based on the identified type of the policy.

11. The method according to claim 1, wherein the intent policy is obtained via translation and orchestration implemented by the first network element.

12. The first network element according to claim 11, wherein the policy creation request further comprises a policy expression, and the policy type identifier is comprised in the policy expression.

13. A communication method performed by a network element having a processor and a memory, the method comprising:
    receiving a policy processing request from a further network element, wherein the policy processing request comprises a policy type identifier, and the policy type identifier indicates that a policy is an intent policy or a non-intent policy; and
    processing the intent policy based on the policy processing request in response to the policy being the intent policy; or
    processing the non-intent policy based on the policy processing request in response to the policy being the non-intent policy.

14. The method according to claim 13, wherein the policy processing request further comprises a policy expression, and
    wherein the processing the intent policy based on the policy processing request in response to the policy being the intent policy comprises:
    generating an intent identifier based on the policy expression;
    querying an intent knowledge repository based on the policy expression, to obtain a query result;

orchestrating the query result to obtain an orchestration result, wherein the orchestration result comprises one or more of the following information:
an intent executable command,
a correspondence between an identifier of an execution device of the intent executable command and a format of the intent executable command, and
an intent target fulfillment condition; and
indicating based on the orchestration result, the execution device to execute the intent executable command.

15. The method according to claim 13, wherein the policy processing request further comprises a policy expression, and
wherein the processing the non-intent policy based on the policy processing request in response to the policy being the non-intent policy comprises:
processing the non-intent policy based on the policy expression.

16. A first network element, comprising at least one processor and a memory, wherein
the memory stores program instructions, and the program instructions are executed by the at least one processor to cause the first network element to perform a method including:
receiving, a policy creation request from a second network element, wherein a type of a policy requested to be created comprises an intent policy or a non-intent policy; and
sending, a policy processing request to a third network element, wherein the policy processing request comprises a policy type identifier, and the policy type identifier indicates that the policy is the intent policy or the non-intent policy.

17. The first network element according to claim 16, wherein the method further comprises:
Identifying the type of the policy based on the policy creation request.

18. The first network element according to claim 16, wherein both the intent policy and the non-intent policy are provided by the second network element.

19. The first network element according to claim 16, wherein the intent policy is obtained via translation and orchestration implemented by the first network element.

20. A network element, comprising:
a processor; and
a memory, wherein the memory is configured to store program instructions, and the processor is configured to execute the program instructions to cause the network element to:
receive a policy processing request from a further network element, wherein the policy processing request comprises a policy type identifier, and the policy type identifier indicates that a policy is an intent policy or a non-intent policy; and
process the intent policy based on the policy processing request in response to the policy being the intent policy or process the non-intent policy based on the policy processing request in response to the policy being the non-intent policy.

* * * * *

UNITED STATES PATENT AND TRADEMARK OFFICE
CERTIFICATE OF CORRECTION

PATENT NO. : 12,028,217 B2
APPLICATION NO. : 18/068300
DATED : July 2, 2024
INVENTOR(S) : Li et al.

It is certified that error appears in the above-identified patent and that said Letters Patent is hereby corrected as shown below:

In the Claims

Claim 14: Column 19, Line 9: reads as "indicating based on the orchestration result, the execution" should read as -- indicating, based on the orchestration result, the execution --.

Signed and Sealed this
Thirteenth Day of May, 2025

Coke Morgan Stewart
*Acting Director of the United States Patent and Trademark Office*